US008111514B2

(12) United States Patent
Imsand

(10) Patent No.: US 8,111,514 B2
(45) Date of Patent: *Feb. 7, 2012

(54) REMOVABLE HARD DRIVE MODULE FOR A COMPUTER WITH IMPROVED THERMAL PERFORMANCE

(75) Inventor: Bruce Imsand, Madison, AL (US)

(73) Assignee: MaxVision Corporation, Madison, AL (US)

( * ) Notice: Subject to any disclaimer, the term of this patent is extended or adjusted under 35 U.S.C. 154(b) by 151 days.

This patent is subject to a terminal disclaimer.

(21) Appl. No.: 12/476,056

(22) Filed: Jun. 1, 2009

(65) Prior Publication Data

US 2009/0273898 A1 Nov. 5, 2009

Related U.S. Application Data

(63) Continuation-in-part of application No. 11/409,296, filed on Apr. 21, 2006, now Pat. No. 7,542,295.

(51) Int. Cl.
*G06F 1/16* (2006.01)
*H05K 5/00* (2006.01)
*H05K 7/00* (2006.01)

(52) U.S. Cl. ........................................ 361/714; 361/726

(58) Field of Classification Search ............. 361/679.33, 361/724–727, 679.46, 679.54, 688–716; 211/26; 312/294
See application file for complete search history.

(56) References Cited

U.S. PATENT DOCUMENTS

| 5,506,750 | A | * | 4/1996 | Carteau et al. | 361/679.32 |
|---|---|---|---|---|---|
| 5,557,499 | A | * | 9/1996 | Reiter et al. | 361/679.39 |
| 5,909,358 | A | * | 6/1999 | Bradt | 361/707 |
| 6,069,792 | A | * | 5/2000 | Nelik | 361/679.47 |
| 6,088,221 | A | * | 7/2000 | Bolognia | 361/679.37 |
| 6,157,540 | A | * | 12/2000 | Eddings et al. | 361/727 |
| 6,373,696 | B1 | * | 4/2002 | Bolognia et al. | 361/679.47 |
| 6,473,298 | B1 | * | 10/2002 | Ruckman et al. | 361/679.33 |
| 6,853,548 | B2 | * | 2/2005 | Vanderheyden et al. | 361/679.02 |
| 6,957,291 | B2 | * | 10/2005 | Moon et al. | 710/302 |
| 6,999,307 | B2 | * | 2/2006 | Peng | 361/679.37 |
| 7,035,096 | B2 | * | 4/2006 | Franz et al. | 361/679.32 |
| 7,092,245 | B2 | * | 8/2006 | Shih | 361/679.33 |
| 7,158,380 | B2 | * | 1/2007 | Green et al. | 361/704 |
| 7,200,008 | B1 | * | 4/2007 | Bhugra | 361/724 |
| 7,280,352 | B2 | * | 10/2007 | Wilson et al. | 361/679.33 |
| 7,312,999 | B1 | * | 12/2007 | Miyamura et al. | 361/724 |
| 7,542,295 | B2 | * | 6/2009 | Imsand | 361/726 |
| 2002/0181194 | A1 | * | 12/2002 | Ho et al. | 361/684 |
| 2002/0181197 | A1 | * | 12/2002 | Huang | 361/685 |

(Continued)

*Primary Examiner* — Jinhee Lee
*Assistant Examiner* — Adrian S Wilson
(74) *Attorney, Agent, or Firm* — David E. Mixon; Bradley Arant Boult Cummings LLP

(57) ABSTRACT

A removable hard drive magazine for a computer with improved thermal performance has been developed. The invention includes a hot pluggable magazine module for organizing multiple hard drives in a computer that includes multiple of hard drives and a sleeve with a plurality of rail slots in the side of the sleeve. A slide rail is attached to the side of each hard drive, where the slide rail is inserted into a rail slot of the sleeve so that the slide rail is exposed externally to the sleeve and is in contact with a thermally conductive elastomeric coupler. A hard drive receptacle that is mounted in the computer is included. The receptacle includes guide slots that mate with the exposed slide rails of the hard drives. A heat sink is mounted on the receptacle that receives heat transferred from the plurality of hard drives through the thermally conductive elastomeric coupler. Finally, a backplane located in rear of the hard drive receptacle, where the backplane attaches the module to the computer.

22 Claims, 14 Drawing Sheets

U.S. PATENT DOCUMENTS

| | | | |
|---|---|---|---|
| 2003/0147219 A1* | 8/2003 | Chou | 361/725 |
| 2003/0183373 A1* | 10/2003 | Sarraf et al. | 165/104.33 |
| 2003/0227752 A1* | 12/2003 | Yair et al. | 361/725 |
| 2004/0012921 A1* | 1/2004 | Hidaka et al. | 361/685 |
| 2004/0264145 A1* | 12/2004 | Miller et al. | 361/725 |
| 2005/0083651 A1* | 4/2005 | Smith et al. | 361/687 |
| 2005/0168940 A1* | 8/2005 | Askeland et al. | 361/687 |
| 2005/0174743 A1* | 8/2005 | Downing et al. | 361/725 |
| 2005/0257232 A1* | 11/2005 | Hidaka | 720/654 |
| 2006/0002093 A1* | 1/2006 | Carlson et al. | 361/726 |
| 2006/0050487 A1* | 3/2006 | Wu et al. | 361/724 |
| 2006/0198112 A1* | 9/2006 | Miller et al. | 361/752 |
| 2006/0221579 A1* | 10/2006 | Liang et al. | 361/724 |
| 2006/0232930 A1* | 10/2006 | Artman et al. | 361/695 |
| 2006/0250766 A1* | 11/2006 | Blaalid et al. | 361/685 |
| 2007/0293137 A1* | 12/2007 | Crippen et al. | 454/184 |
| 2008/0049388 A1* | 2/2008 | Shogan et al. | 361/680 |

* cited by examiner

REMOVABLE HARD DRIVE MODULE FOR A COMPUTER WITH IMPROVED THERMAL PERFORMANCE

CROSS-REFERENCE TO RELATED APPLICATIONS

This application is a continuation-in-part of U.S. patent application Ser. No. 11/409,296 titled "Removable Hard Drive Module for a Computer" that was filed on Apr. 21, 2006.

FIELD OF THE INVENTION

The invention relates generally to computer hardware components. More specifically, the invention relates to a removable module that contains computer hard drives.

BACKGROUND ART

A computer "hard drive" is a memory device that stores data for a computer. It is also called a "hard disk drive" or "hard disk". The computer houses a hard disk, where files and folders of computer data are physically located. The data is stored on the hard drive magnetically, so it stays on the drive even after the power supply is turned off.

As the capabilities of computer systems expand, the demand also increases for more data storage capacity. This is especially true for portable computer systems where physical space is typically at a premium. It is also advantageous to have a system where hard drives can be installed and removed as a set of multiple hard drives for exchange or transfer of data from one computer to another. At other times for software upgrades, At times hard drives fail and individual hard drives must be replaced, etc. Consequently, a need exists for a removable hard drive module that contains multiple hard drives in an organized set with the flexibility to replace individual hard drives for a computer. In some occasions the computer cannot be taken off line or turned off and the hard drives may need to be removed and replaced as a set or as individual drives while the computer continues to run. This has been called a hot pluggable or hot swap hard drive system.

SUMMARY OF THE INVENTION

In some aspects, the invention relates to a hot pluggable module for organizing multiple hard drives in a computer, comprising: a plurality of hard drives; a sleeve with a plurality of rail slots in the side of the sleeve; at least one slide rail that is attached to the side of each hard drive, where the slide rail is inserted into a rail slot of the sleeve so that the slide rail is exposed externally to the sleeve and is in contact with a thermally conductive elastomeric coupler; a hard drive receptacle that is mounted in the computer, where the receptacle includes guide slots that mate with the exposed slide rails of the hard drives; a heat sink mounted on the receptacle that receives heat transferred from the plurality of hard drives through the thermally conductive elastomeric coupler; and a backplane located in rear of the hard drive receptacle, where the backplane attaches the module to the computer.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1A:
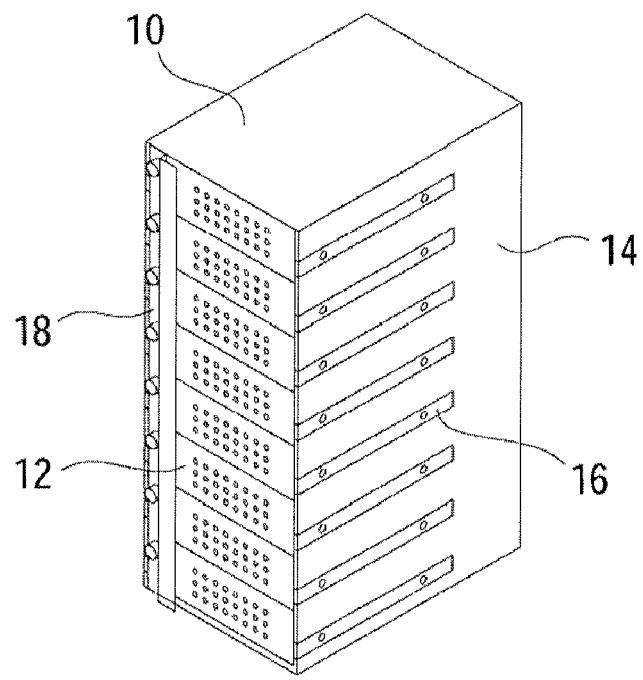
FIGS. 1A and 1B show a perspective view and an exploded view of a multiple hard drive module in accordance with one embodiment of the present invention.

The invention relates to a module containing multiple hard drives which can be inserted and removed as an organized set of hard drives into a receptacle. The receptacle provides precision mechanical alignment and electrical connection of the set of hard drives into a hard drive connector backplane. The hard drive backplane provides for a power and signal interconnect so that they can be interconnected to all necessary components for proper operation of the computer. The system provides for the removal and insertion of a set of drives with the computer turned off or turned on and operating. Individual drives can be removed and replaced from the multiple hard drive module without the need to first remove the multiple hard disk module from its receptacle. This allows defective drives to be individually replaced while other hard drives within the module continue to function normally in the computer.

The multiple hard drive module allow the hard drives to be precision spaced so that a predetermined air space exist between hard drives to provide for air flow for cooling the hard drives. Two guide rails attached to each hard drive in the module precisely guide and align each hard drive into individual precision placed connectors on the receptacle backplane. A binder bar loosely but positively attaches all hard drives to the modules organizer sleeve. The organizer sleeve allows the hard drive set to be handled, inserted, removed, transported, stored and managed as a set and does not interfere with the precision alignment rail function of each hard drive which allows the receptacle to individually align each hard drive for a precise docking of each hard drive to its corresponding backplane connector. Detaching the binder bar allows one or more individual hard drives to be removed from the sleeve. This can be done regardless of weather the module is inserted into the receptacle and docked and actively operating in the backplane, or the module is removed from the receptacle and placed on a table.

The receptacle includes precision fabricated slots which mate with each hard drive's pair of rails and precisely align each hard drive to the receptacles connector backplane. The backplane is designed in such as way that air can flow from the front of the drive to the rear of the drive with air flow allowed to freely flow through openings in the backplane and into the interior of the computer chassis where fans are typically located to assist with airflow. A retainer bar or retention latch system securely and firmly hold the multiple hard drive module to the receptacle for transport while installed in the computer.

The hard drive module receptacle system allows the flexibility to have a single large multiple hard drive module plug into a single receptacle or alternatively multiple smaller modules continue a smaller number of hard drives to be concurrently installed into the same receptacle so long as the total number of drives in all modules does not exceed the total drive capacity of the receptacle. Individual drives may also be installed into the receptacle without being organized into a sleeve and be used in harmony with sets of drives organized into module sleeves.

These concepts are key enablers to computer applications in high security military applications where drive sets must be removed rapidly as well as high bandwidth streaming digital data such as recording broadcast video and digital cinematography cameras in future feature movie production. In these and other applications, data recorded on multiple hard drives in a RAID configuration are removed, installed and managed as a fault tolerant array so that failure a hard disk does not result in the lose of data.

Hard drives selected for used in this invention are assumed to be designed to be hot pluggable but this is not an absolute requirement, but may limit use to installing and removing after the power has been turned off. Furthermore the design is not limited to a particular capacity, technology type, interface type, physical size or number of drives. Further, airflow may be designed from front to back of the drives, but other configurations currently being implemented provide for side to side airflow.

Figure 1B:
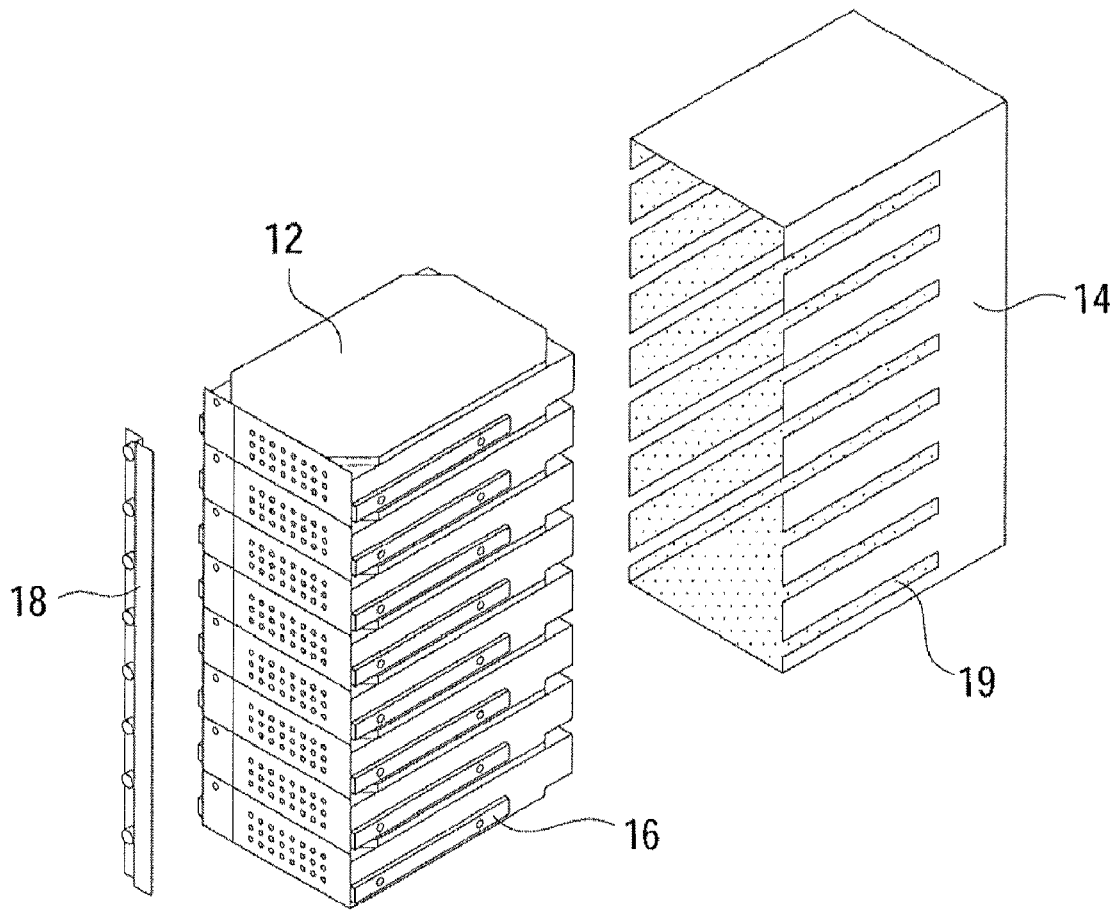

FIG. 1A shows a perspective view of one example of the invention. In this example, the module 10 includes: multiple hard drives 12; a sleeve 14; slide rails 16 for each hard drive; and a binder bar 18. FIG. 1B shows an exploded view of the same example. In FIG. 1B, the sleeve 14 is shown with multiple slots 19 in the sides of the sleeve 14. The module 10 serves to hold multiple hard drives 12 together as a single component that can be inserted into and removed from a computer. The individual hard drives are held together with a binder bar 18. The binder bar 18 is attached onto each individual hard drive so that they are held together as a group. In this example, the binder bar 18 is attached with a knurled knob to the side of each hard drive 12. This allows the binder bar to be installed and removed by hand.

Figure 2:
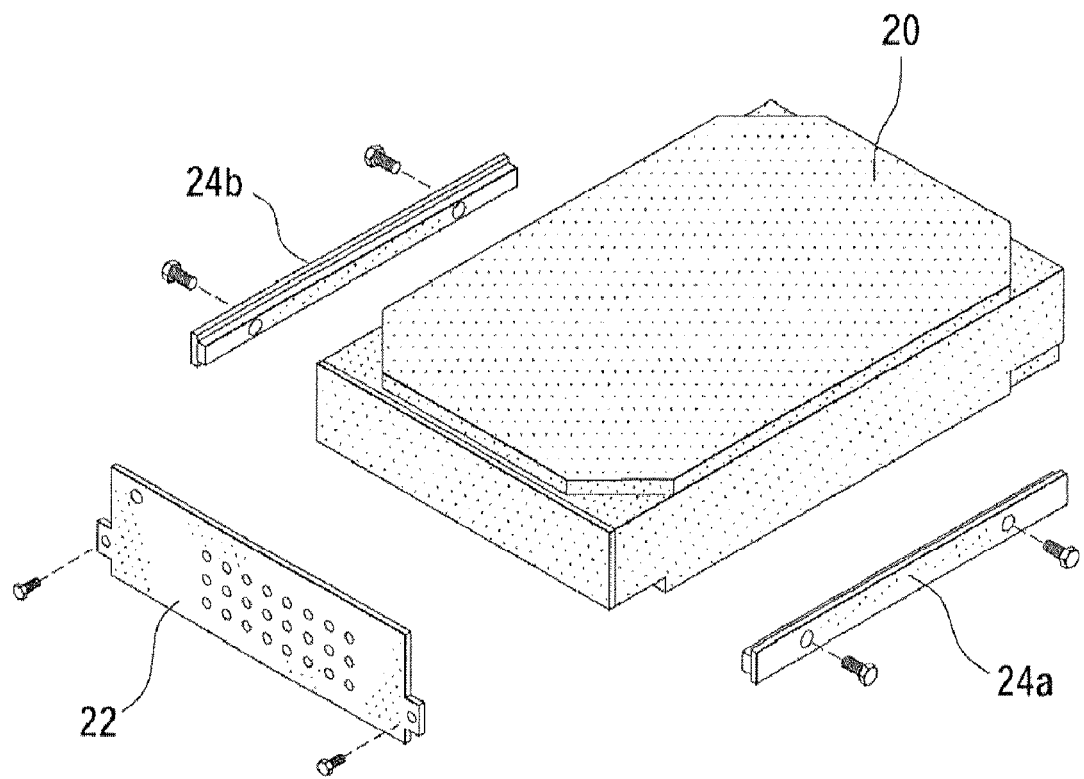
FIG. 2 shows an exploded view of a single hard drive in accordance with one embodiment of the present invention.

FIG. 2 shows an exploded view of a single hard drive 20. In this example, a face plate 22 is mounted on the front of the hard drive rails 24*a* and 24*b* which in turn are attached to hard drive 20. The face plate serves as the attached point for the binder bar 18 shown previously in FIGS. 1A and 1B. Also shown, are two slide rails 24*a* and 24*b* that are mounted on each side of the hard drive 20. In the example of FIG. 2, the face plate and slide rails are attached to the hard drive with screws. However, other types of attachment mechanisms may be used in alternative embodiments.

Figure 3A:
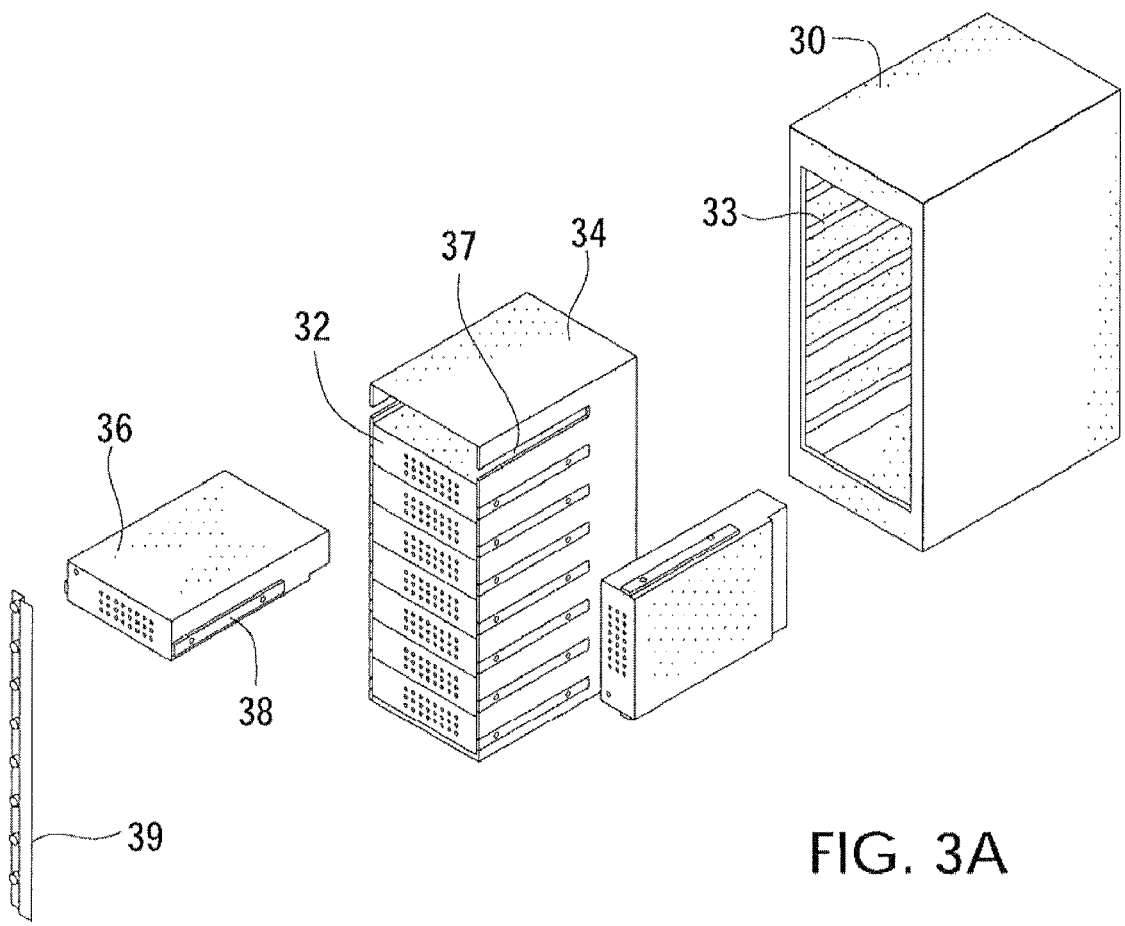
FIGS. 3A and 3B show an exploded view and a side view of a multiple hard drive module and a computer in accordance with one embodiment of the present invention.
Figure 3B:
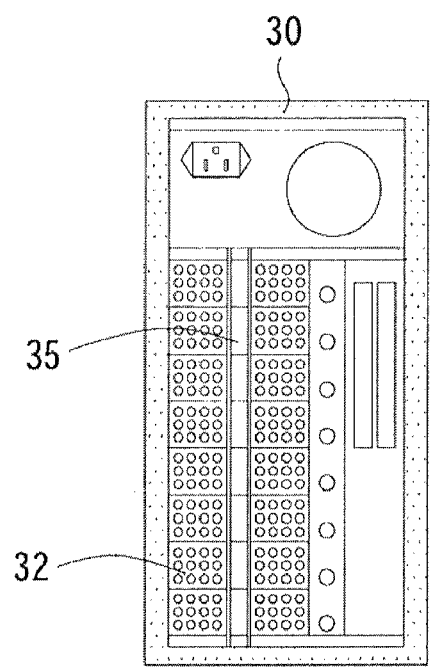

FIGS. 3A and 3B show different views of the module 32 as it is inserted into a computer 30. FIG. 3A shows a partially exploded view of the module 32 with a single hard drive 36 and the binder bar 39 detached from the module. As previously mentioned, the slide rails 38 guide the hard drives 36 into the slots 37 of sleeve 34. The slide rails 38 extend outside the sides sleeve. In this example, the slide rails 38 guide the module 32 into the computer 30 by match up with module guide slots inside the hard drive receptacle 33 that is located on the interior of the computer 30. Once the module 32 is inserted into the computer 30, a retainer bar 35 may be used to hold the module 32 in place.

The module 32 connects to the computer 30 through the hard drive receptacle 33 that is mounted with the computer. The receptacle 33 contains a porous backplane (not shown) mounted in the rear which is designed such that air can flow freely from front to back of the module. The backplane may be connected to the hard drive controller of the computer and required power supplies. In some embodiments, the backplane attaches to a RAID controller. The RAID (Redundant Array of Inexpensive Disks) system is used to increase performance and provide fault tolerance for hard disk drives in computers.

Various RAID level standards are used with various levels of system redundancy and/or fault tolerance that are well known to those of skill in the art. The present invention may use RAID-0, RAID-1, or RAID-5 levels in various embodiments. In another embodiment, the invention may use a JBOD (Just a Bunch of Disks) configuration that provides no system redundancy with the hard drives.

Figure 4A:
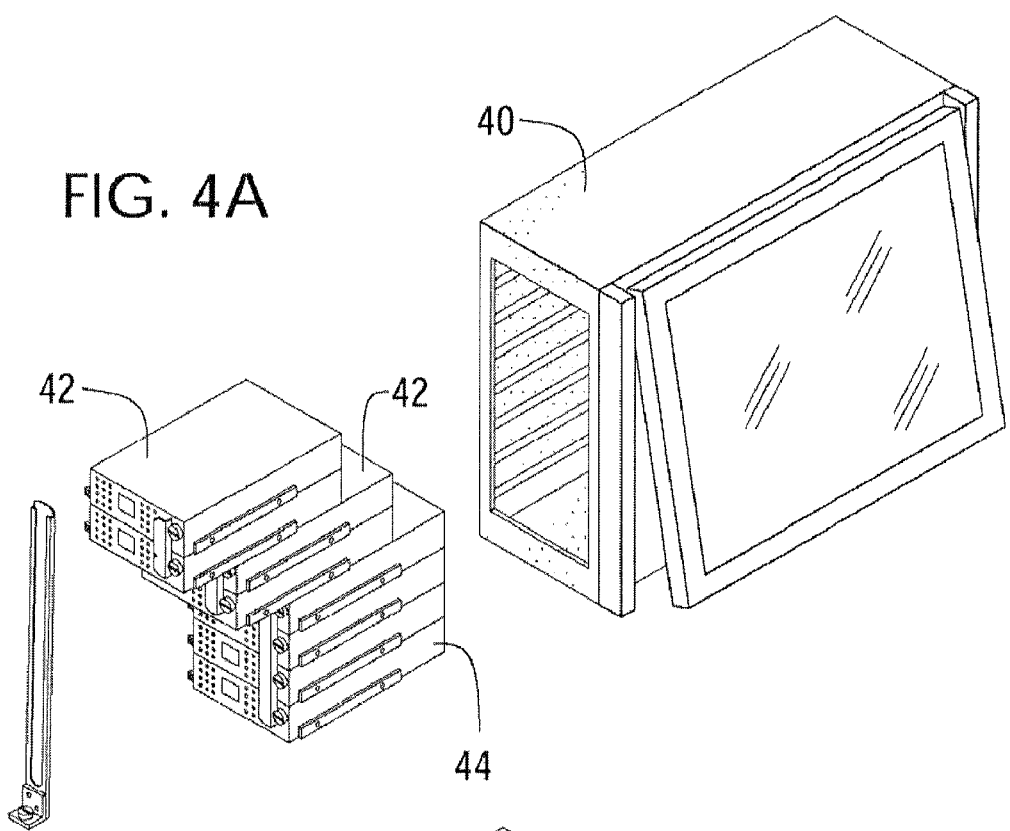
FIGS. 4A-4D show exploded views of multiple hard drive modules in accordance with alternative embodiments of the present invention.
Figure 4B:
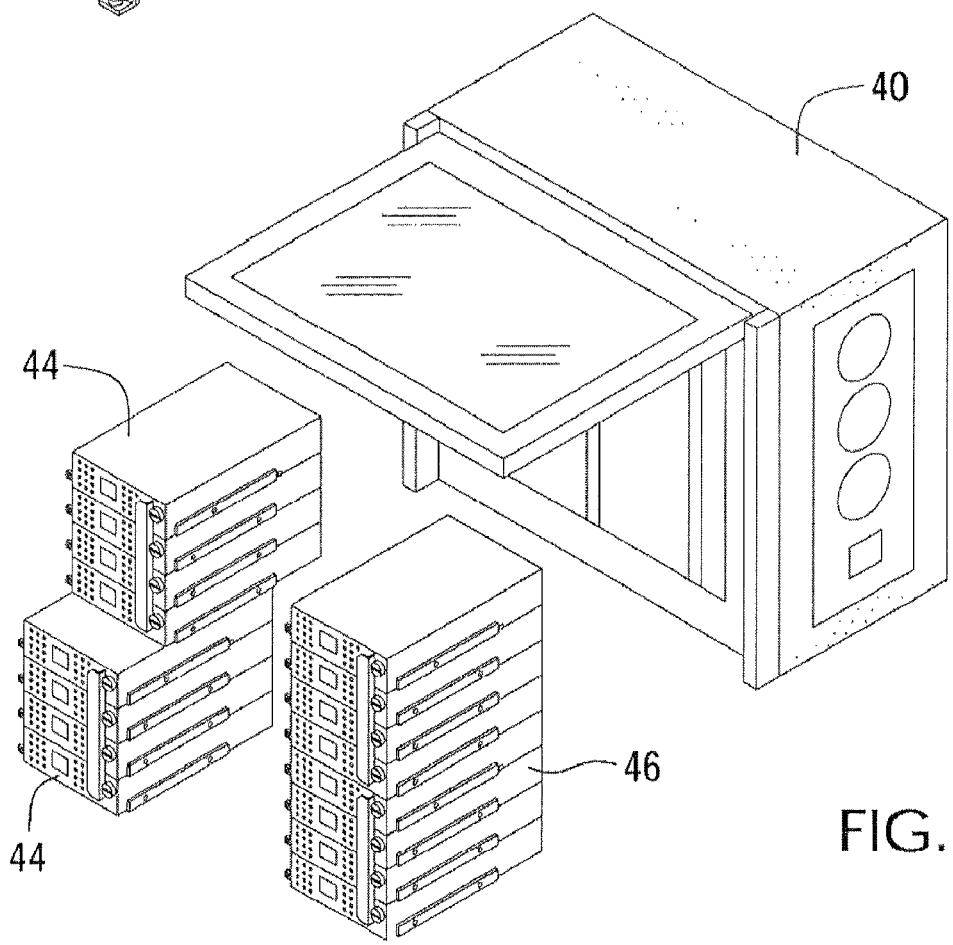

FIGS. 4A-4D show examples of the present invention using modules of different numbers of hard drives. While the previous examples show a module with 8 hard drives, different sized modules may be used together in combination to replicate a larger capacity module. For example, FIG. 4A shows a similar computer 40 as shown previously in FIGS. 3A and 3B. However, two separate two-drive modules 42 are combined with a four-drive module 44 when inserted into the computer. This will duplicate the same performance as an eight-drive module but each smaller capacity module is an independent component which can be separately installed, removed and managed. FIG. 4B shows another example of different capacity modules. In this example, an eight-drive module 46 is inserted into a server 48 along with two separate two-drive modules 44. In this example, the modules are shown for use in a network server.

Figure 4C:
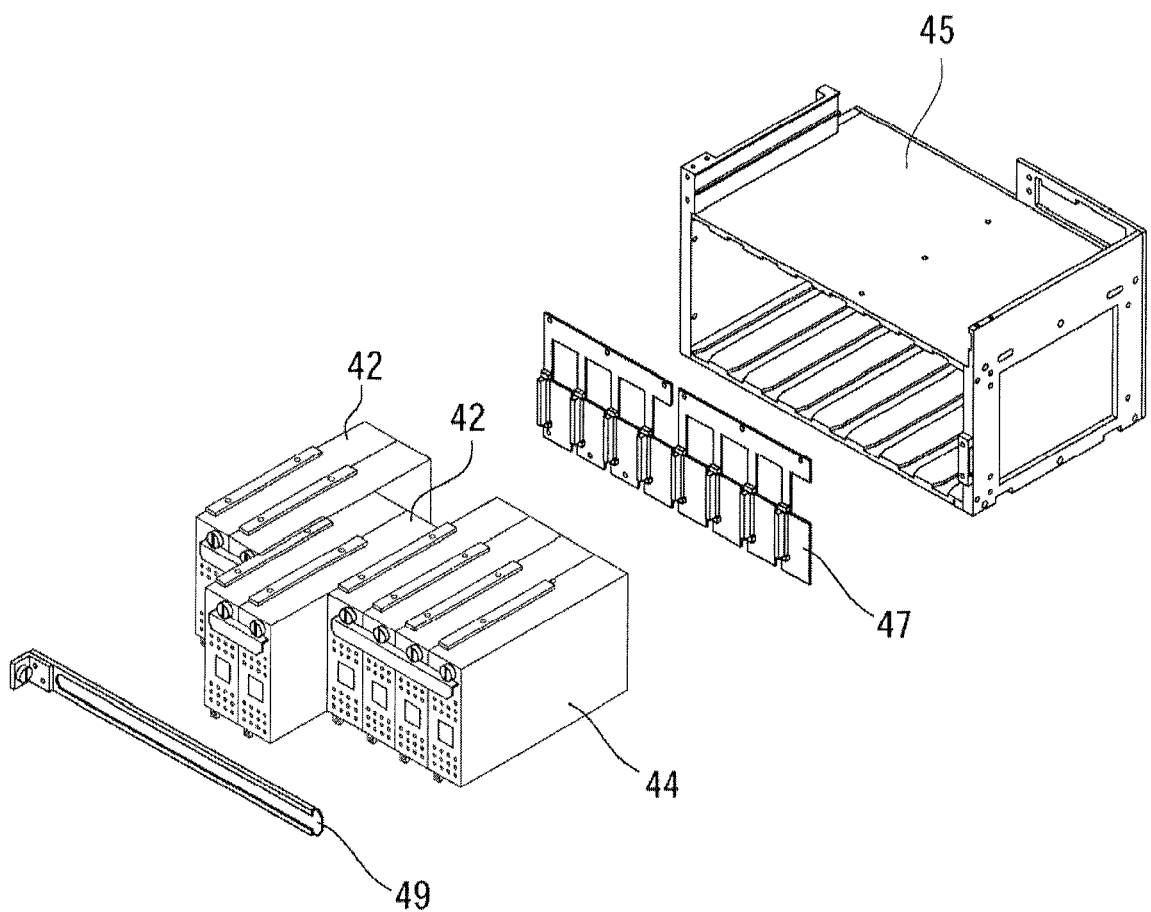
Figure 4D:
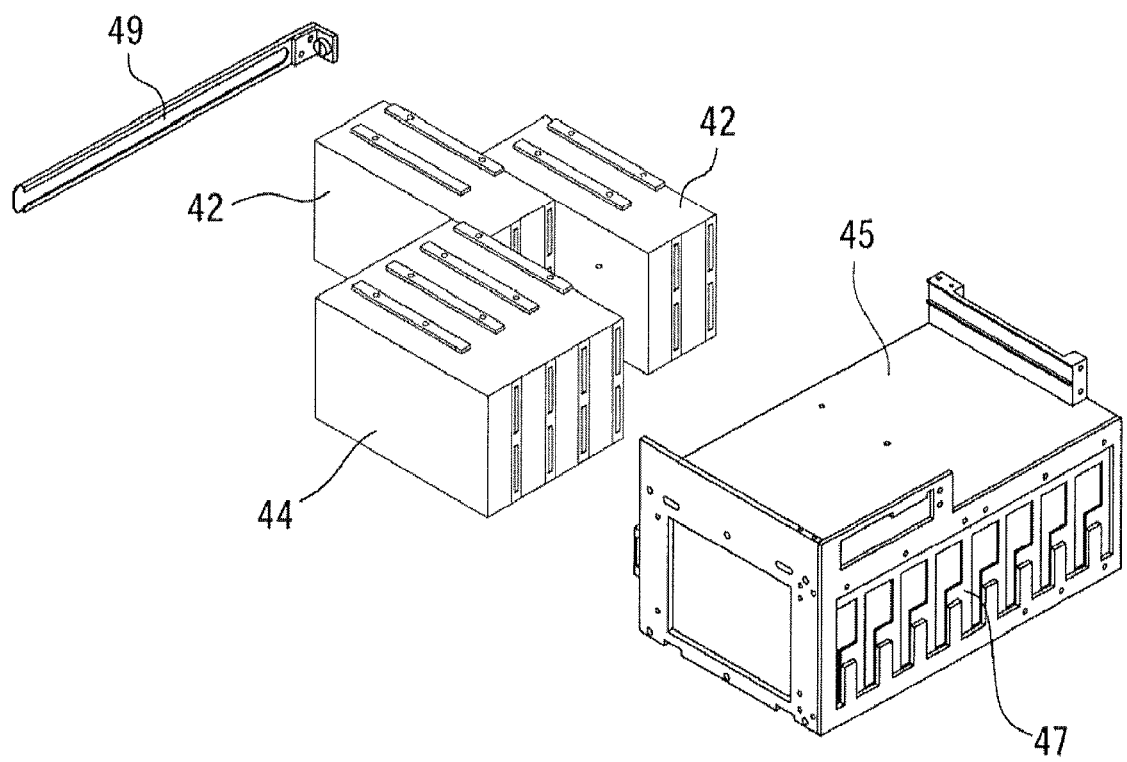

In addition to the vertical orientation shown in FIGS. 3A-4B, the module may be inserted in a horizontal orientation as shown in FIGS. 4C and 4D. In this embodiment, a pair of two-drive modules 42 are combined with a four-drive module 44 and inserted in a horizontal receptacle 45 that is mounted within the computer. Also shown are a porous backplane 47 and a retainer bar 49. The backplane 49 is mounted in the rear of the receptacle 45 as shown in FIG. 4D. It provides a connection for the module to a drive controller as described previously. The retainer bar 49 attaches over the modules to hold them in place within the sleeve 45. While 2, 4 and 8 drive modules have been shown, it should be understood that other sized modules such as 12 or 16 drive modules may be used based on system requirements and space availability. The combinations of modules will only be limited by the size of the receptacle which is integral to the alignment of the system.

It is important to understand that the slide rails fit loosely into the slots of the sleeve. The sleeve is merely an organizer for grouping the drives together in a module. It floats within the space of the receptacle of the computer system and it does not provide final precision alignment. When each drive is plugged into the sleeve, the precision rails of the drive mate with the corresponding precision slots within the sleeve. This allows the individual hard drives to be inserted and dock with the backplane in the rear of the receptacle without damaging the connection mechanisms. The key advantage of the system is to allow the each hard drive to independently float within the sleeve. This allows the modules and individual drives to be inserted and removed easily and quickly. In some embodiments, the tolerance for the floating of the hard drive within the sleeve is between 0.03 and 0.06 inches. This is typically a looser tolerance that a design for computer hardware components that are inserted into component receptacles.

Figure 5:
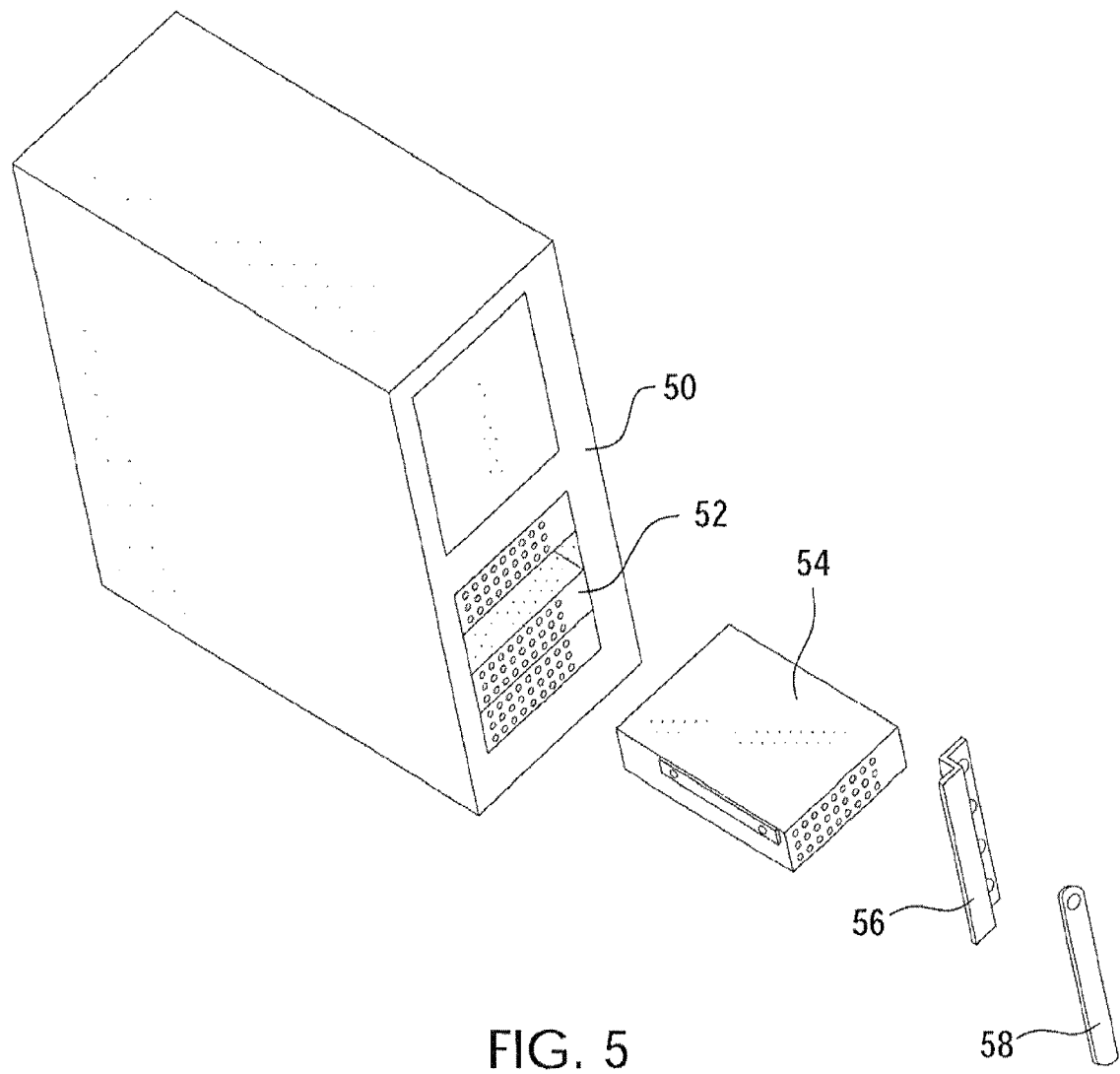
FIG. 5 shows an exploded view of a multiple hard drive module with a single hard drive removed in accordance with one embodiment of the present invention.

One feature of the present invention allows each individual hard drive to be independently removed from the module. FIG. 5 shows a single hard drive 54 that is pulled out of the module 52 in a computer 50 after the retainer bar 58 and binder bar 56 are removed. In other embodiments, the individual drives or even an entire module may be removed while the computer is in operation. This is known as "hot-pluggable" device. The removal or insertion of the drives will not affect the operation of a working computer. The computer will automatically reconfigure and reinstall the hard drives and continue operation.

Figure 6A:
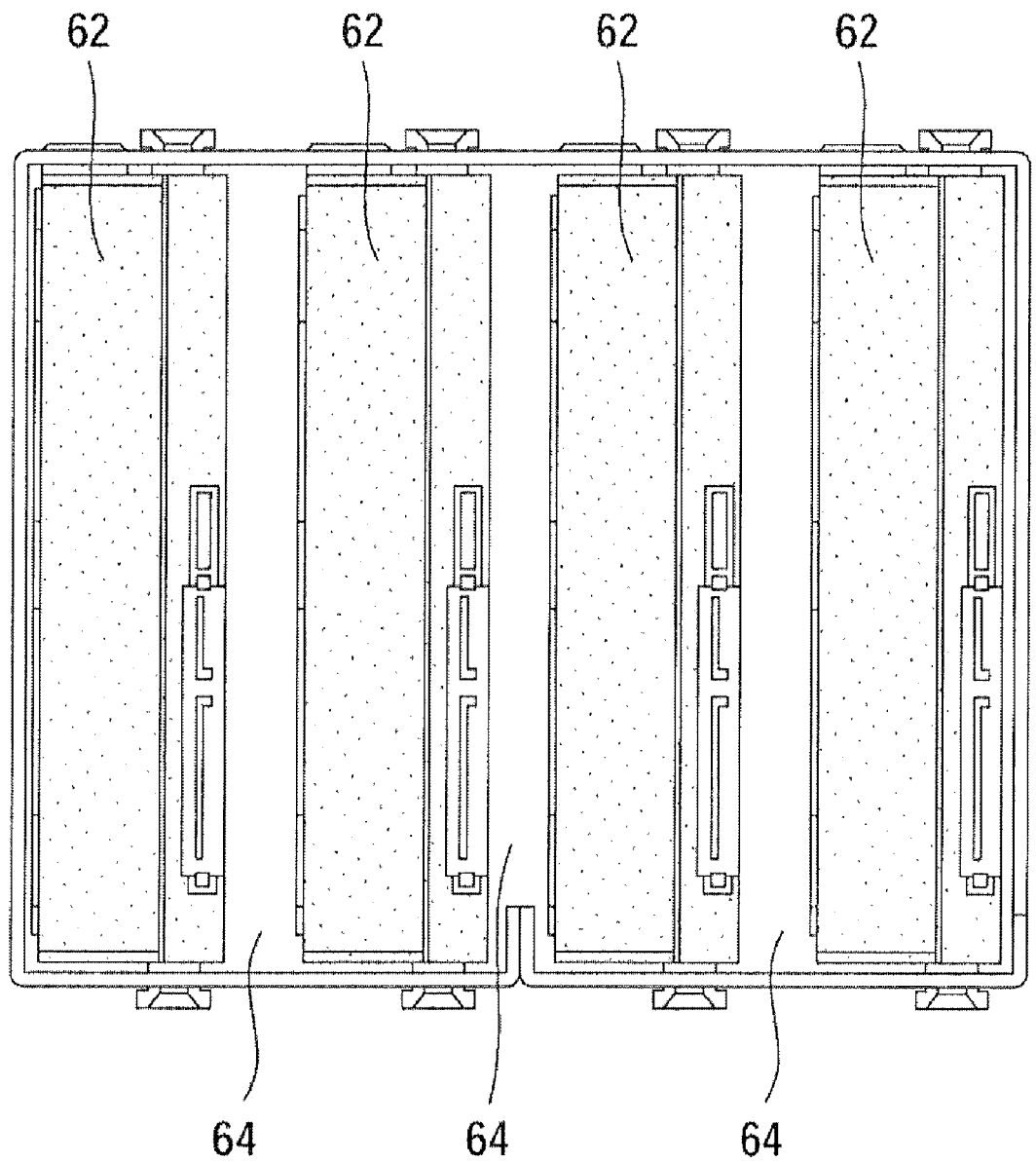
FIGS. 6A and 6B show side views of multiple hard drive modules with different air gaps between hard drives in accordance with one embodiment of the present invention.
Figure 6B:
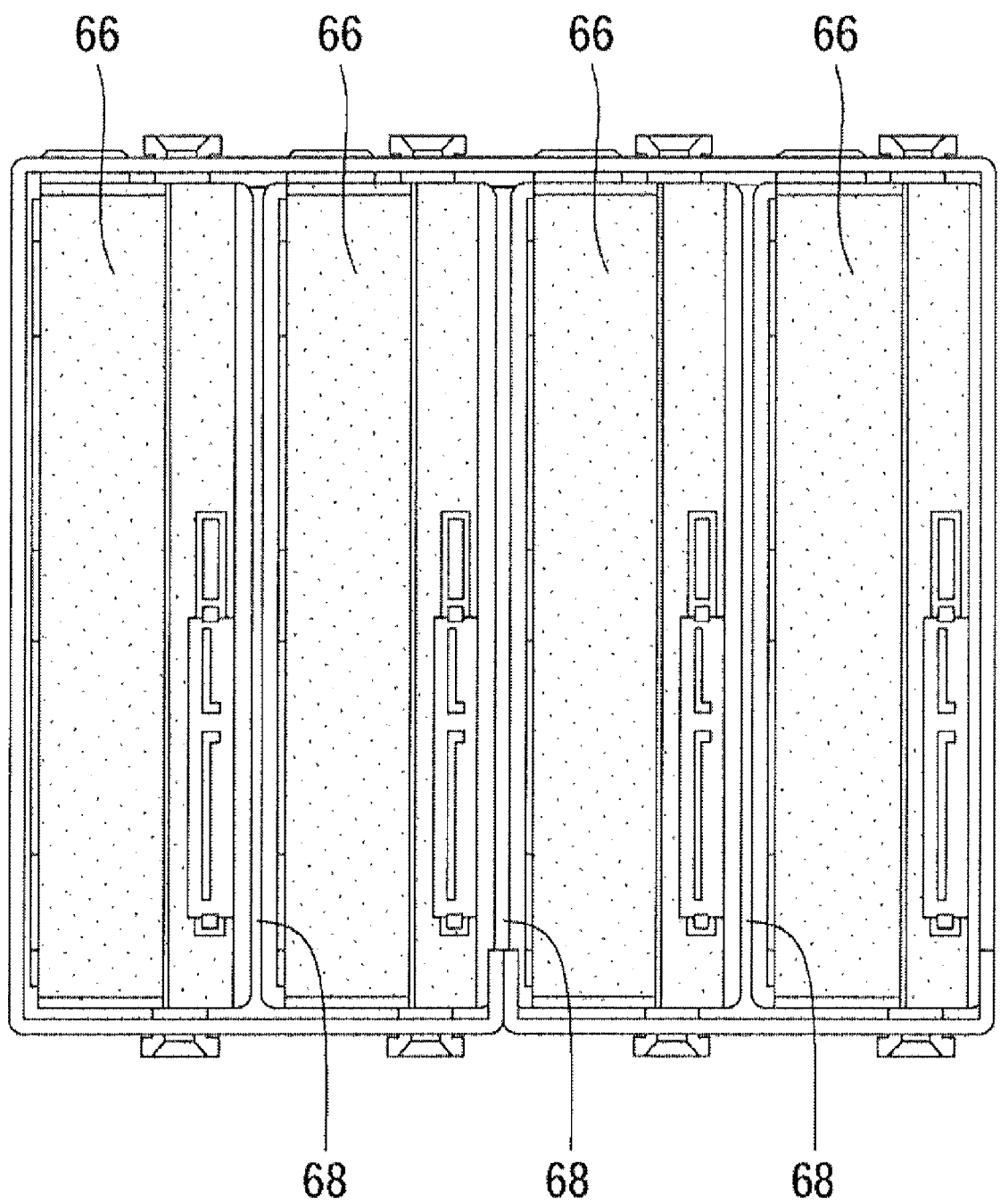

The hard drives used in some embodiments may be a "Serial Advanced Technology Attachment," or "Serial ATA" (SATA) drive. Other embodiments may use a "Small Computer System Interface" (SCSI) drive that sometimes called a "skuzzy" drive or a more modern version of SCSI called Serial Attached SCSI (SAS). These types of drives are well known to those of ordinary skill in the art. It should be understood that other drive types and configurations could be used with the present invention. In the examples shown in the Figures, a SATA drive is shown with a 500 GB storage capacity. The physical size of the hard drives may vary with different embodiments. Examples of hard drives that are used include a 2.5" drive and a 3.5" drive. These dimensions refer to the diameter of the disk platter within the drive and not the exterior width. The 3.5" drive has an exterior width of 4.0 inches and an exterior thickness of 1.0 inches. As shown in FIG. 6A, the center to center distance between 3.5" drives 62 in a module is 1.25 inches with a 0.25 inch air gap 64 between drives. The 2.5" drive has an exterior width of 70 mm and an exterior thickness of 9.5 mm. As shown in FIG. 6B, the center to center distance between 2.5" drives 66 in a module is 12.5 mm with a 3 mm air gap 68 between drives.

Figure 7:
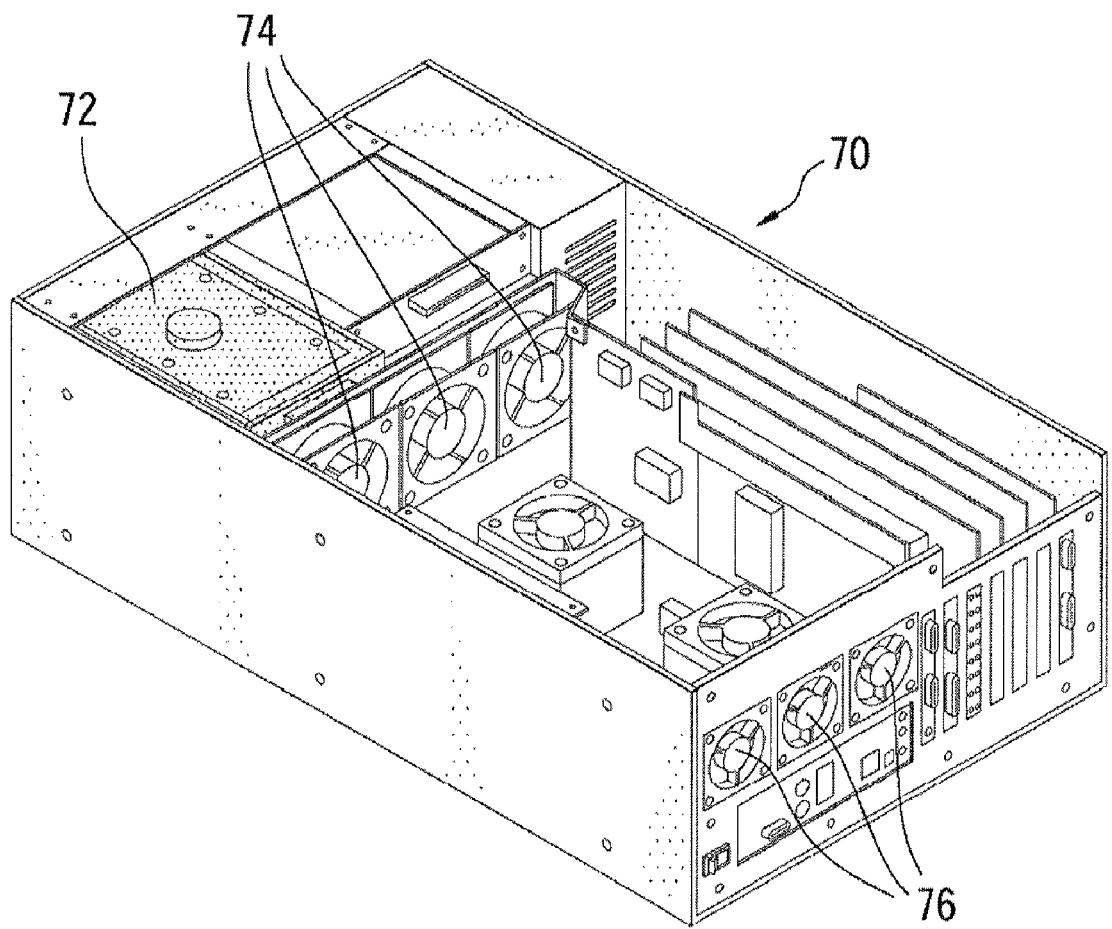
FIG. 7 shows a cut away view of a computer with cooling fans for the hard drive modules in accordance with one embodiment of the present invention.
Figure 8:
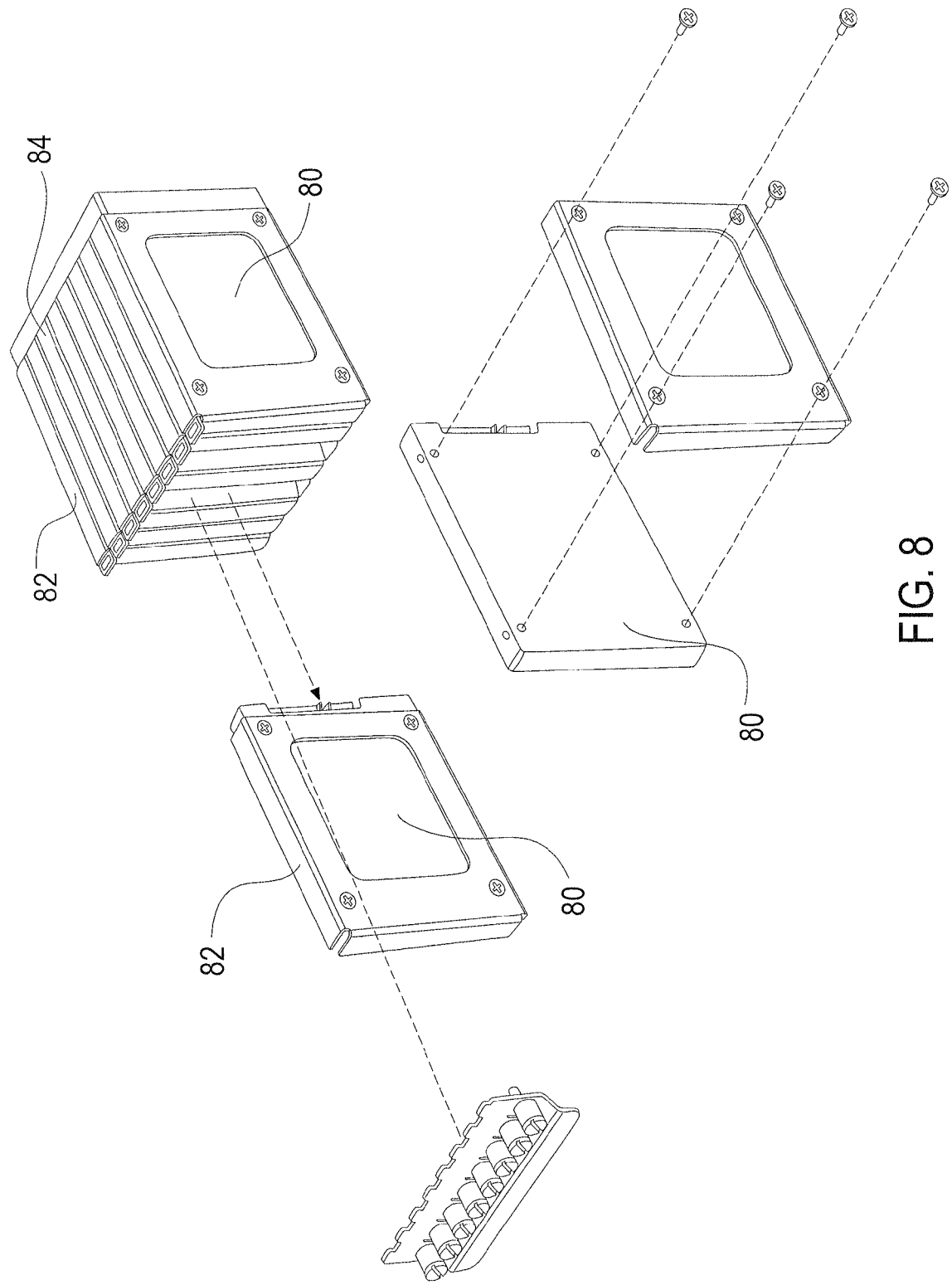
FIGS. 8-11 show different views of an alternative embodiment of the present invention that uses a thermally conductive elastomeric coupler to transfer heat away from the hard drives.
Figure 9:
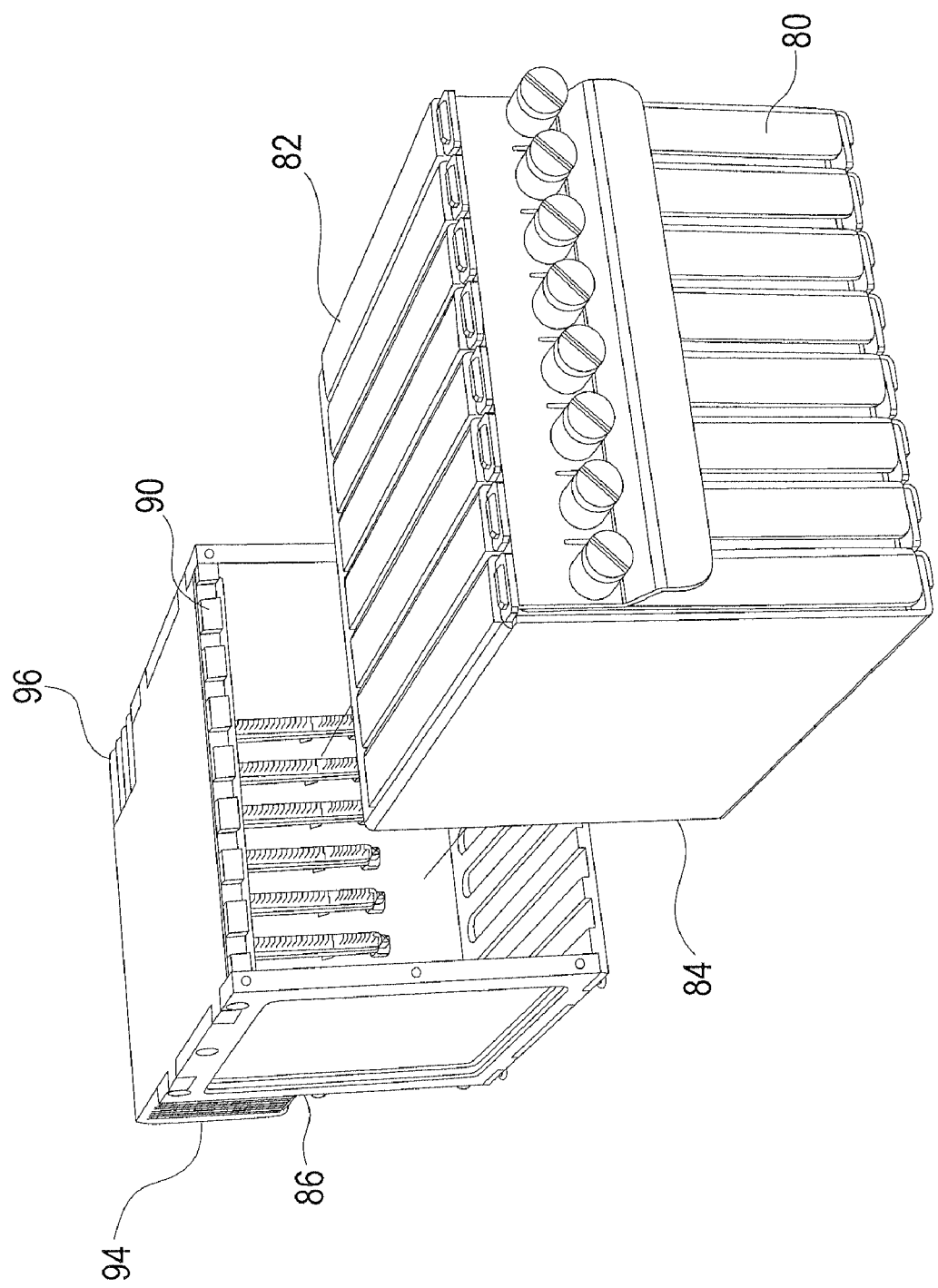
Figure 10:
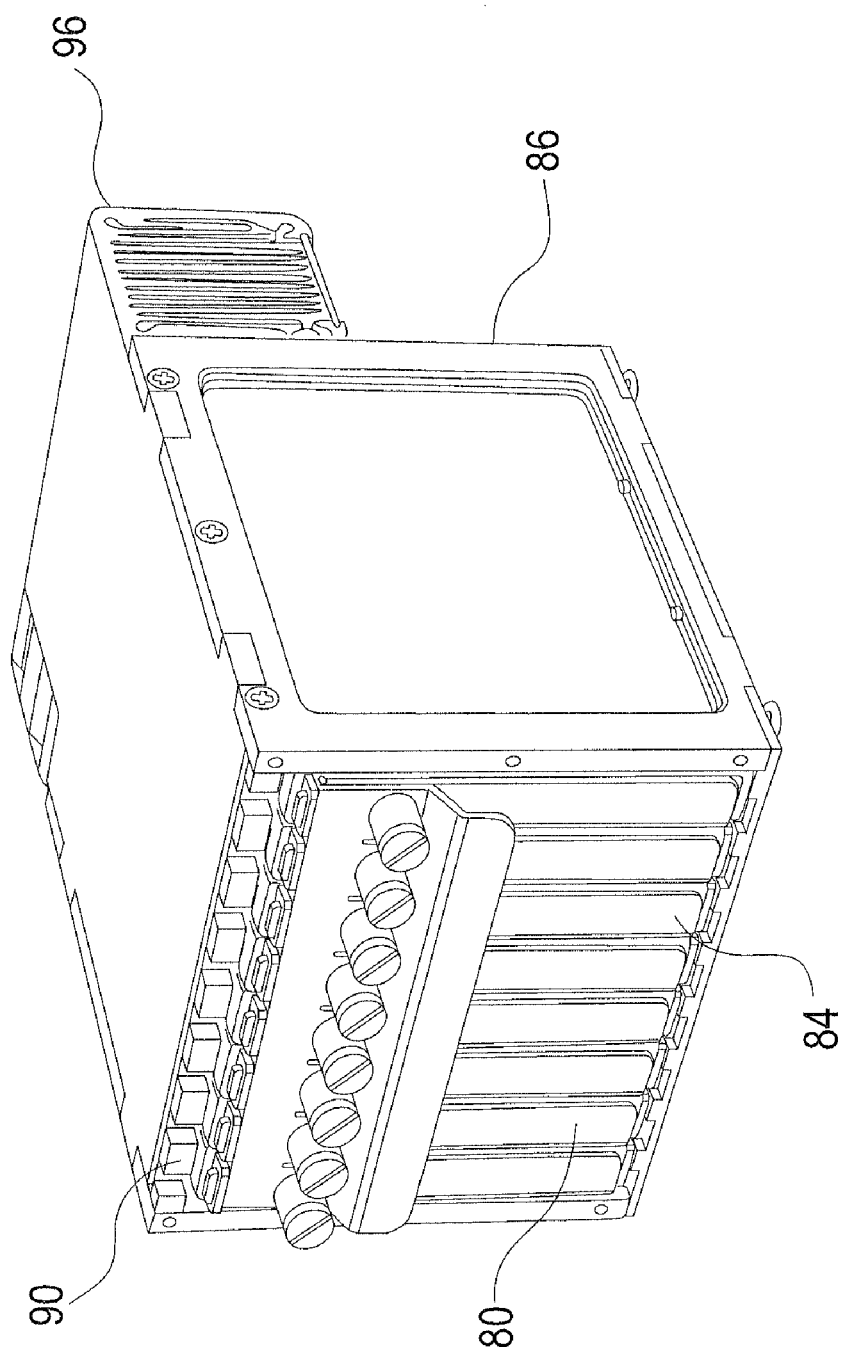
Figure 11:
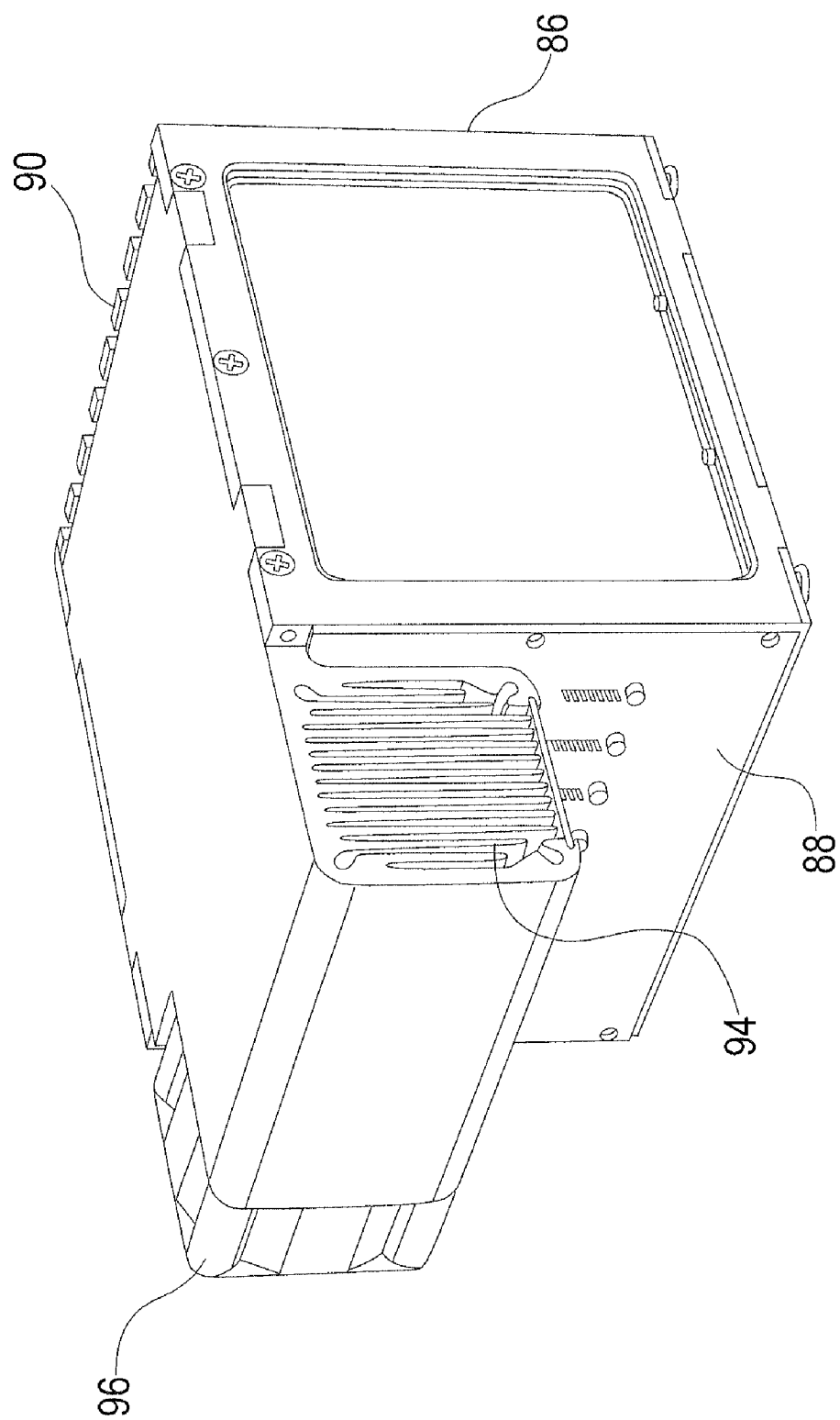

The size of the gap between drives is important because it allows cooling air to be circulated through the module. A bigger air gap allows greater air flow between the hard drives and consequently greater cooling. Cooling of the hard drives is critical to ensure proper system performance. This is especially true in austere environments such as a desert or other hot climates. FIG. 7 shows a cut away view of an example of an internal cooling system. In this example, the hard drive module 72 is installed in the computer 70. A bank of multiple cooling fans 74 are placed directly behind the module. The fans 74 draw cooler air from outside the computer in through the air gaps between the drives of the module. The air is then pulled out of the computer with exhaust fans 76 located opposite the module 72 and receptacle. Portable computers many times need to operate at really high temperatures such as 60° C. One advantage of the present invention is that fresh air is pulled through the air gap of the drives first before reaching the interior of the computer. This allows the hard drives to operate at or near the maximum of their specific temperature limits.

In other embodiments, the modules could be used with other computer devices such as a portable workstation computer or a video system. A video system is used to record and store digital video data. These systems are sometimes called a "digital film recorder (DFR)", a "digital video recorder (DVR)" or a "digital disk recorder (DDR)". These systems typically require a massive amount of data storage for a portable digital video system. It is fully intended that the invention could be used with any such device that needs a removable hard drive.

In an alternative embodiment of the present invention, the invention has been improved to have better thermal performance by improving the cooling of the hard drives. FIGS. 8-11 show different views of this embodiment. This embodiment is based on the use of low power 2.5" SATA or SAS drives 80. However, other types of drives could be used. In this embodiment, the rails 82 of the module 84 are modified to facilitate heat transfer from the hard disk drive to the chassis 86. The backplane 88 is no longer required to be porous to allow air flow. Instead, it may be solid. In this embodiment, heat is transferred from the hard drive to the rails through a thermally conductive elastomeric coupler 90 which in turn conveys the heat to the metal chassis 92 of the module 84. Heat is then transferred to a heat sink 94 at the rear of the module. The heat sink may be cooled by an optional fan 96. In other embodiments, the fan is not present and natural convection air flow provides all of the necessary cooling.

This embodiment has the advantage of allowing the drives to be packed closer together since air flow between them is not required. This embodiment works especially well with both rotating type disk drives and solid state disk drives using flash memory technology.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A hot pluggable module for organizing multiple hard drives in a computer, comprising:
   a plurality of hard drives;
   a sleeve with a plurality of rail slots in the side of the sleeve;
   at least one slide rail that is attached to the side of each hard drive, where the slide rail is inserted into a rail slot of the sleeve so that the slide rail is exposed externally to the sleeve and is in contact with a thermally conductive elastomeric coupler;
   a hard drive receptacle that is mounted in the computer, where the receptacle includes guide slots that mate with the exposed slide rails of the hard drives;
   a heat sink mounted on the receptacle that receives heat transferred from the plurality of hard drives through the thermally conductive elastomeric coupler; and
   a backplane located in rear of the hard drive receptacle, where the backplane attaches the module to the computer.

2. The module of claim 1, further comprising:
   a binder bar that binds each of the hard drives together.

3. The module of claim 2, further comprising:
   a face plate mounted on the front of each hard drive.

4. The module of claim 3, where the binder bar binds the hard drives together by attaching to the face plates of the hard drives.

5. The module of claim 4, where the binder bar is attached to the hard drives with a knurled knob.

6. The module of claim 1, where each hard drive comprises a SATA drive.

7. The module of claim 1, where each hard drives comprises a SAS drive.

8. The module of claim 1, where the each hard drive is a 2.5" hard drive.

9. The module of claim 1, where the sleeve has a capacity to hold two hard drives.

10. The module of claim 1, where the sleeve has a capacity to hold four hard drives.

11. The module of claim 1, where the sleeve has a capacity to hold eight hard drives.

12. The module of claim 1, where the sleeve has a capacity to hold twelve hard drives.

13. The module of claim 1, where the sleeve has a capacity to hold sixteen hard drives.

14. The module of claim 1, where the slide rails fit into the rail slots so that each hard drive may float within the sleeve.

15. The module of claim 14, where the hard drive may float within the sleeve between 0.03 to 0.06 inches.

16. The module of claim 1, where each hard drive may be separately removed from the module.

17. The module of claim 1, further comprising:
a retainer bar that secures the module inside the computer.

18. The module of claim 1, where the computer comprises a portable workstation computer.

19. The module of claim 18, where the computer comprises a server.

20. The module of claim 18, where the backplane connects to a hard drive controller of the computer.

21. The module of claim 20, where the hard drive controller comprises a RAID controller.

22. The module of claim 21, where computer has a JBOD configuration.

* * * * *